United States Patent
Krasnov et al.

(10) Patent No.: US 8,815,420 B2
(45) Date of Patent: Aug. 26, 2014

(54) COATED ARTICLE HAVING ZINC OXIDE SEED LAYER WITH REDUCED STRESS UNDER FUNCTIONAL LAYER AND METHOD OF MAKING THE SAME

(75) Inventors: Alexey Krasnov, Canton, MI (US); Richard Blacker, Farmington Hills, MI (US)

(73) Assignee: Guardian Industries Corp., Auburn Hills, MI (US)

(*) Notice: Subject to any disclaimer, the term of this patent is extended or adjusted under 35 U.S.C. 154(b) by 655 days.

(21) Appl. No.: 12/923,390

(22) Filed: Sep. 17, 2010

(65) Prior Publication Data

US 2012/0070652 A1    Mar. 22, 2012

(51) Int. Cl.
B32B 15/04    (2006.01)
B32B 17/06    (2006.01)

(52) U.S. Cl.
USPC ........... 428/701; 428/432; 428/433; 428/434; 428/688; 428/689; 428/699; 428/702

(58) Field of Classification Search
CPC ........ C03C 17/00; C03C 17/06; C03C 17/22; C03C 17/23; C03C 17/34; C03C 17/3411; C03C 17/36; C03C 17/3602; C03C 17/3607; C03C 17/3615; C03C 17/3618; C03C 17/3644
USPC ......... 428/432, 701, 702, 433, 434, 688, 689, 428/699
See application file for complete search history.

(56) References Cited

U.S. PATENT DOCUMENTS

| | | | |
|---|---|---|---|
| 4,336,120 A | 6/1982 | Sakakura et al. | |
| 5,470,618 A | 11/1995 | Ohara et al. | |
| 5,487,918 A | 1/1996 | Akhtar | |
| 5,532,062 A * | 7/1996 | Miyazaki et al. | 428/432 |
| 6,458,673 B1 | 10/2002 | Cheung | |
| 6,541,133 B1 * | 4/2003 | Schicht et al. | 428/697 |
| 6,558,800 B1 | 5/2003 | Stachowiak | |
| 6,576,349 B2 | 6/2003 | Lingle et al. | |
| 6,783,876 B2 * | 8/2004 | Schicht et al. | 428/697 |
| 6,797,389 B1 * | 9/2004 | Depauw | 428/432 |
| 7,153,578 B2 | 12/2006 | Chonlamaitri et al. | |
| 7,198,850 B2 * | 4/2007 | DePauw | 428/432 |
| 7,217,460 B2 | 5/2007 | Nunez-Regueiro et al. | |

(Continued)

FOREIGN PATENT DOCUMENTS

JP    10-297962    11/1998
WO    WO 2009/103929    8/2009

(Continued)

OTHER PUBLICATIONS webqc (http://www.webqc.org/ periodictable-Zinc-Zn.html), 2013.*

(Continued)

Primary Examiner — David Sample
Assistant Examiner — Lauren Colgan
(74) Attorney, Agent, or Firm — Nixon & Vanderhye P.C.

(57) ABSTRACT

A coated article is provided with at least one functional layer, such as an infrared (IR) reflecting layer of or including silver and/or gold. A dielectric and substantially transparent seed layer is provided under and directly contacting the functional layer. In certain example embodiments, the seed layer includes an oxide of zinc and gallium for lowering the stress of the layer and thus improving durability of the overall coating.

11 Claims, 5 Drawing Sheets

(56) References Cited

U.S. PATENT DOCUMENTS

| | | |
|---|---|---|
| 7,235,160 B2 | 6/2007 | Delahoy et al. |
| 7,390,572 B2 | 6/2008 | Butz et al. |
| 7,396,580 B2 | 7/2008 | Kawashima et al. |
| 7,455,910 B2 | 11/2008 | Stachowiak |
| 7,534,500 B2 | 5/2009 | Kobayashi et al. |
| 7,537,677 B2 | 5/2009 | Lu et al. |
| 7,597,962 B2 | 10/2009 | Butz et al. |
| 7,622,161 B2 | 11/2009 | Veerasamy |
| 7,629,742 B2 | 12/2009 | Anderson et al. |
| 7,641,978 B2 | 1/2010 | Veerasamy |
| 7,645,487 B2 | 1/2010 | Petrmichl et al. |
| 7,648,769 B2 | 1/2010 | Blacker et al. |
| 7,655,313 B2 | 2/2010 | Blacker et al. |
| 7,678,446 B2 | 3/2010 | Yasuda et al. |
| 7,695,785 B2 | 4/2010 | Lu et al. |
| 7,718,266 B2 | 5/2010 | Kriltz et al. |
| 7,718,267 B2 | 5/2010 | Veerasamy |
| 2003/0143435 A1* | 7/2003 | Schicht et al. ............. 428/697 |
| 2004/0219343 A1* | 11/2004 | DePauw ..................... 428/212 |
| 2006/0159932 A1 | 7/2006 | Lu et al. |
| 2006/0188730 A1 | 8/2006 | Varanasi et al. |
| 2008/0057225 A1 | 3/2008 | Stricker et al. |
| 2010/0072884 A1 | 3/2010 | Tchakarov et al. |

FOREIGN PATENT DOCUMENTS

| | | |
|---|---|---|
| WO | WO 2009/115596 | 9/2009 |
| WO | WO 2009/115599 | 9/2009 |
| WO | WO 2009/133076 | 11/2009 |

OTHER PUBLICATIONS webqc (http://www.webqc.org/periodictable-Gallium-Ga.html), 2013.*

International Search Report mailed Sep. 6, 2011.

"Zinc Oxide and Related Compounds: Order Within the Disorder", Martins et al., Proc. of SPIE vol. 7217; Dec. 31, 2009, pp. 1-13.

"Magnetron Sputtering of Transparent Conductive Zinc Oxide: Relation Between the Sputtering Parameters and the Electronic Properties", Ellmer, J. Phys. D: Appl Phys. 33 (2000) R17-R-32.

"Durability of Doped Zinc Oxide/Silver/Doped Zinc Oxide Low Emissivity Coatings in Humid Environment", Ando et al., Thin Solid Films 516 (2008) 4574-4577.

U.S. Appl. No. 12/923,391, filed Sep. 17, 2010; Imran et al.

* cited by examiner

COATED ARTICLE HAVING ZINC OXIDE SEED LAYER WITH REDUCED STRESS UNDER FUNCTIONAL LAYER AND METHOD OF MAKING THE SAME

BACKGROUND OF THE INVENTION

Low-emissivity coatings are known in the art. Low-E coatings typically comprise at least one functional layer such as an infrared (IR) reflecting layer. The IR reflecting layer(s), or functional layer(s), may be of or based on silver or gold in typical instances. Low-E coatings are typically used in window applications such as in IG (insulating glass) window units, monolithic window, architectural windows, and/or in vehicle windows.

The thin IR reflecting layers (e.g., based on silver) are often used to reflect IR radiation. These silver-based layers are susceptible to damage, and generally require protective layers on both sides to protect them. The layer directly under and contacting the silver based IR reflecting layer in some instances is of zinc oxide doped with aluminum (ZnO:Al).

However, in a coating, the ZnO:Al layer can become stressed, which results in the formation of weak spots and contributes to a lack of overall durability. This lack of durability can result in corrosion of the coating. The silver based IR reflecting layer can become damaged, chemically and/or mechanically, due to the stress in the ZnO:Al layer. The stress of the coating can become particularly problematic during or due to thermal tempering, when the glass substrate with the coating thereon is heated to a high temperature (e.g., at least 580 degrees C.) and then rapidly cooled down.

There is therefore a need in the art for a coated article having a layer, to be located proximate or near (e.g., under) an IR reflecting layer and/or a silver based layer, that enables a coated article to realize improved durability and/or optical characteristics.

BRIEF SUMMARY OF THE INVENTION

In certain example embodiments of this invention, there is provided a coated article including a coating supported by a substrate, the coating comprising at least the following layers, moving away from the glass substrate: a dielectric layer comprising zinc and gallium; an infrared (IR) reflecting layer comprising silver located on the substrate over and directly contacting the layer comprising zinc and gallium, and at least one additional layer on the substrate over at least the IR reflecting layer; and wherein the layer comprising zinc and gallium includes from about 0.01 to 10% gallium, optionally more preferably from about 0.25 to 10% gallium. The layer comprising zinc and gallium is sometimes called a "seed" layer because it is directly under and contacting an IR reflecting layer and/or a layer comprising silver, although other materials can instead be used.

In other example embodiments of this invention, there is provided a coated article including a coating supported by a substrate, the coating comprising at least the following layers, moving away from the substrate: a substantially transparent seed layer comprising a first material and a second material, wherein a difference between an ionic radius of the first material and an ionic radius of the second material differs by no more than about 15 pm; a layer comprising silver located on the substrate over and directly contacting the seed layer, at least one dielectric layer over at least the layer comprising silver; wherein the first material is a metal, and the second material is used to dope an oxide of the first material in the seed layer; and wherein the seed layer includes from about 0.01 to 10%, more preferably from about 0.25 to 10%, of the second material. The coated article may or may not be heat treated (e.g., thermally tempered). The second material may be gallium in certain example embodiments, although other material may instead be used.

In another example embodiment of this invention, of this invention, there is provided a coated article including a coating supported by a substrate, the coating comprising at least the following layers, moving away from the glass substrate: a first layer comprising an oxide of zinc and gallium; an infrared (IR) reflecting layer comprising silver located on the substrate over and directly contacting the first layer, a second layer located on the substrate and at least over the IR reflecting layer and the first layer; and wherein the gallium makes up from about 0.01 to 10%, more preferably from about 0.25 to 10%, of the first layer.

In yet another example embodiment of this invention, there is provided a sputtering target for sputter depositing a layer comprising gallium-doped zinc oxide, wherein the target comprises zinc, and from about 0.01 to 10%, more preferably from about 0.25 to 10%, gallium. The target may be a planar target, or more preferably a rotating cylindrical magnetron type sputtering target.

In another example embodiment of this invention, there is provided a target used for sputter depositing a seed layer, wherein the target comprises a first material and a second material, wherein an ionic radius of the first material and an ionic radius of the second material differ by no more than about 15 pm.

In still other example embodiments of this invention, there is provided a method for making a coated article, comprising the steps of: forming a low-emissivity coating by providing a first layer comprising a first material and a second material having atomic radii differing by no more than 15 pm on a glass substrate, providing an IR reflecting layer over and contacting the first layer, and providing a second layer over the IR reflecting layer.

DETAILED DESCRIPTION OF THE INVENTION

Referring now more particularly to the accompanying drawings in which like reference numerals indicate like parts or layers throughout the several views.

Coated articles herein may be used in coated article applications such as monolithic windows, IG window units, vehicle windows, and/or any other suitable application that includes single or multiple substrates such as glass substrates, or even in certain instances as filters for electronic devices.

Certain embodiments of this invention relate to a coated article which includes at least one substrate (e.g., glass substrate) supporting a multilayer coating. The coating typically has at least one functional layer such as an infrared (IR) reflecting layer which reflects and/or blocks at least some IR radiation. The IR reflecting layer(s) may be of or include a material such as silver, gold, or the like in different embodiments of this invention. Often, an IR reflecting layer is sandwiched between at least first and second dielectric layers of the coating. The lower dielectric layer directly under and contacting the function layer (e.g., layer comprising silver) may be referred to as a seed layer. The IR reflecting layer and the seed layer are typically substantially transparent to visible light (e.g., at least about 30% transparent, more preferably at least about 40% transparent, even more preferably at least about 50% transparent, and most preferably at least about 60% or 70% transparent).

In certain example embodiments of this invention, it has surprisingly been found that the provision of a layer consisting essentially of, or comprising, a gallium-doped oxide of zinc as a seed layer(s) of such a coating unexpectedly improves physical and chemical durability of the coating in a manner which does not significantly degrade other electrical properties of a coated article, or its optical properties such as visible transmission and/or color. One or more such gallium-doped zinc oxide based seed layers may be provided in a given coating in different embodiments of this invention. Moreover, gallium-doped zinc oxide layer(s) may be provided in any type of solar control or low-E (low-emissivity, or low-emittance) coating or may be used in an electronic device in different embodiments of this invention, and the specific coatings described herein are for purposes of example only unless recited in the claim(s). In the figures, example layers of or including gallium-doped zinc oxide are referred to by reference numerals 7, 7'. In further example embodiments, (upper) contact layer 11 may also be of or include gallium-doped zinc oxide.

A typical silver-based coating includes at least one thin silver-based layer protected by at least one transparent layer on each side. The silver based layer (9, 9') is substantially metallic or metallic in certain example embodiments. In certain instances, the silver-based layer (9, 9') is deposited on a substantially transparent dielectric seed layer (7, 7') which can comprises or consists essentially of an oxide of zinc (Zn) and gallium (Ga). In certain example embodiments, the seed layer may comprise a crystalline oxide of zinc, with a certain crystal orientation, to ensure that the layer has optimal electrical and optical performance.

Zinc oxide doped with aluminum for reactive deposition is traditionally used as the material of choice for a seed layer in reactive sputtering (e.g., large-area magnetron DC sputtering). Aluminum is provided as a dopant in zinc oxide at least in part because there is a requirement for a certain electrical conductivity of the sputtering target during the deposition target.

However, the aluminum-doped zinc or zinc oxide layer(s) may experience stress in the coating stack, which results in the formation of weak spots, and contributes to an overall lack of durability of the coating, and which can even include corrosion of the coating. The stress of the coating becomes especially evident during heat treatment such as thermal tempering, when the glass substrate with the coating thereon is heated to high temperatures (e.g., at least about 580 degrees C.) and rapidly cooled down.

It has been found that a reason for stress in an aluminum-doped zinc or zinc oxide layer is the mismatch between the ionic radii of the zinc particles and that of aluminum particles. The ionic radius of the "host," zinc, is approximately 74 picometers (pm), whereas the ionic radius of aluminum is much smaller (53.5 pm). As a result of this size mismatch, the substitution of zinc with the dopant aluminum can cause the host lattice (e.g., the zinc oxide lattice) to shrink, which in turn may cause stress in the zinc oxide-based layer, the silver-based layer, and in the entire coating stack.

It has surprisingly been found that gallium-doped zinc oxide may be used in certain example embodiments in order to form a more durable coating. A layer comprising gallium-doped zinc oxide (e.g., 7, 7') may be provided directly under and contacting a functional layer comprising silver or gold (e.g., 9, 9') in certain example embodiments. In certain embodiments, this gallium-doped zinc oxide layer may be used as a dielectric and substantially transparent seed layer in a coated which may be used in a window unit as a low-E coating or in an electronic device, for example. In other example embodiments, the gallium-doped zinc oxide layer may also be used as a contact or upper contact layer in a coating.

In certain example embodiments of this invention, a layer of or including gallium-doped zinc oxide may be tuned in a manner so as to reduce the stress in the layer. It has been found that gallium has a more optimal ionic radius (when used with zinc) than does aluminum, and is therefore better suited to be used for doping layers based on zinc oxide in certain example embodiments. Moreover, it has been found gallium-doped zinc oxide layers suffer from less stress than an aluminum-doped zinc oxide layers, so that such layer(s) may be used in low-E coatings or even in electronic devices increase the overall durability without significantly changing the visible appearance of the coated article or certain performance data. The ionic radius of gallium is larger than that of aluminum—approximately 62 pm. It is believed that because the ionic radii of gallium particles are zinc particles are typically closer in size than those of aluminum and zinc, less stress is created in the layer when the aluminum particles are substituted with gallium. Therefore, in certain example embodiments, it is surprisingly advantageous for the ionic radii of the host particles and the dopants to differ by no more than about 15 pm, more preferably no more than about 13.5 pm, and most preferably no more than about 12 pm.

In certain example embodiments, the zinc oxide may be doped with a combination of both Al and Ga particles, as this too will reduce stress. In certain example embodiments, the zinc oxide based layer (e.g., 7, 7') may be doped with from about 0.25-10% Al and Ga, more preferably from about 0.25-5% Al and Ga, and even more preferably from about 1-5% Al and Ga combined. These alternative embodiments are possible, although the preferred embodiment is zinc oxide doped with such amounts of Ga (instead of Al).

In certain example embodiments of this invention, there is less size mismatch between the ionic radii of gallium and that of zinc (e.g., the ionic radii of gallium and zinc are closer in value). Therefore, there will be much less shrinkage of a zinc oxide layer doped with gallium as compared to aluminum-doped zinc oxide. While gallium is the preferred material for doping zinc oxide, this invention is not so limited, and other materials with the requisite ionic radius may be used.

In certain example embodiments of this invention, gallium-doped zinc oxide may be used to replace a layer of aluminum-doped zinc oxide, or any other layer provided directly underneath and contacting a silver and/or gold based layer. The use of a layer of gallium-doped zinc oxide in this respect has been surprisingly found to improve chemical, electrical, and heat stability of the coated article.

In certain example embodiments, a zinc based target is provided in order to form the gallium-doped zinc oxide-based layer (e.g., via reactive sputtering). The target used may be either metal or ceramic. The sputter chamber may contain oxygen and/or argon during the sputtering process, in order to sputter a seed layer comprising an oxide of zinc and gallium.

The zinc based target contains gallium to facilitate reactive sputtering, in certain example embodiments. The zinc target may contain from about 0.01 to 10% gallium (by weight), more preferably from about 0.25 to 10% gallium (by weight), more preferably from about 0.25 to 5% gallium (by weight), and most preferably from about 1-5% or 1-4% gallium (by weight). Additionally, according to certain example embodiments of this invention, a sputter-deposited gallium-doped zinc oxide-based layer (7, 7') may contain from about 0.01 to 10% gallium, more preferably from about 0.25 to 10% gallium (by weight), more preferably from about 0.25 to 5% gallium, and most preferably from about 1-5% or 1-4% gallium (by weight).

The substrate 1 (e.g., glass substrate) upon which the coating including the layer comprising gallium-doped zinc oxide is deposited may, during deposition, be kept at room temperature or may be heated in certain example embodiments. The substrate 1 may preferably be at a temperature less than about 300 degrees C., more preferably less than 200 degrees C., and most preferably, less than 150 degrees C., and often at approximately room temperature.

A coated article as described herein (e.g., see FIGS. 1-5) may or may not be heat treated (e.g., thermally tempered) in certain example embodiments. Such heat treatment typically requires use of temperature(s) of at least about 580 degrees C., more preferably of at least about 600 degrees C. and still more preferably of at least 620 degrees C. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., for a sufficient period to allow tempering and/or heat strengthening. This may be for at least about two minutes, or up to about 10 minutes, in certain example embodiments.

Gallium-doped zinc oxide layers according to different embodiments of this invention realize good mechanical and chemical durability. Thus, coated articles having such layers are advantageous in that they retain good properties associated with aluminum, and additionally will make a less stressed, more durable layer stack and coated article.

In addition to being used as a seed layer, gallium-doped zinc oxide layers according to different example embodiments of this invention may be used in various locations, such as over and contacting an IR reflecting layer. The example coated articles described below and shown in FIGS. 1-5 are provided for purposes of example only.

Figure 1:
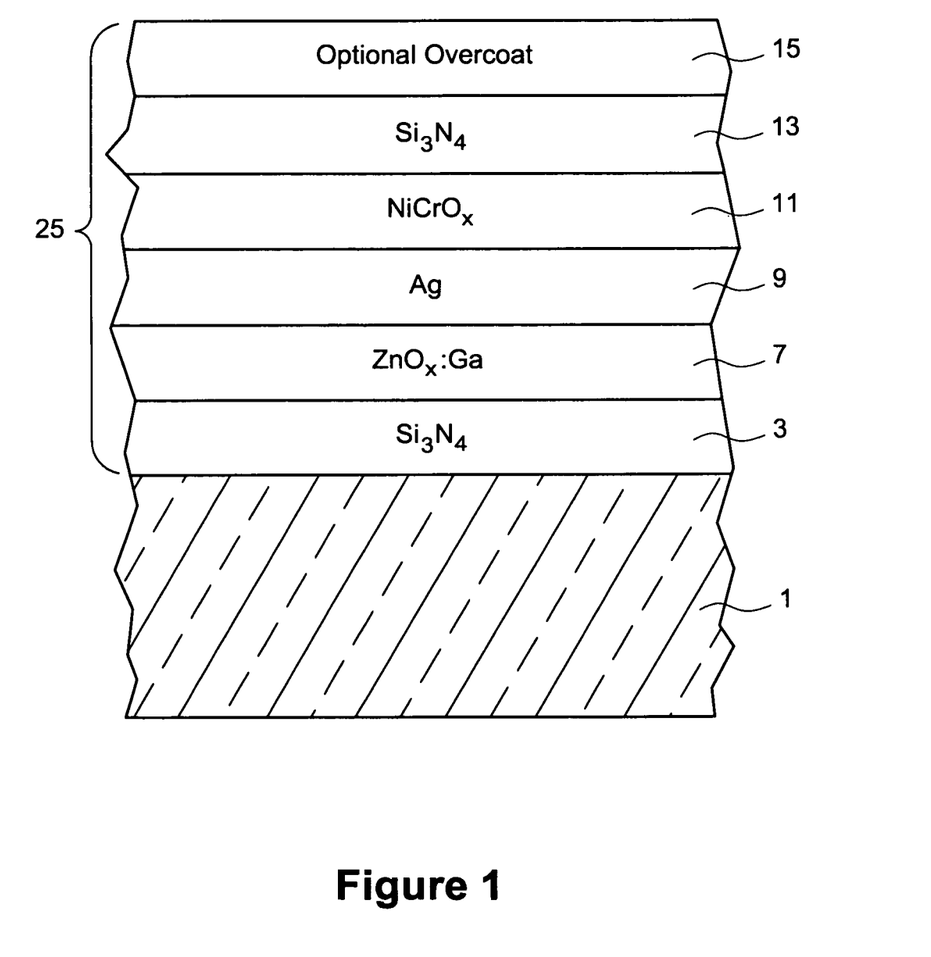
FIG. 1 is a cross-sectional view of a coated article according to a first example embodiment of this invention.

FIG. 1 is a cross sectional view of a coated article according to an example embodiment of this invention. The coated article includes glass substrate 1 (e.g., clear, green, bronze, or blue-green glass substrate from about 1.0 to 10.0 mm thick, more preferably from about 1.0 mm to 6.0 mm thick), and a multi-layer coating (or layer system) provided on the substrate either directly or indirectly. As shown in FIG. 1, the coating 25 comprises dielectric layer 3, gallium-doped zinc oxide inclusive seed layer 7, IR reflecting layer 9 including or of silver, gold, or the like, upper contact layer 11 of or including an oxide of Ni and/or Cr (e.g., $NiCrO_x$) or the like, dielectric layer 13, and dielectric layer 15 of or including a material such as silicon nitride, zirconium oxide, and/or silicon oxynitride which may in certain example instances be a protective overcoat. Other layers and/or materials may also be provided in certain example embodiments of this invention, and it is also possible that certain layers may be removed or split in certain example instances.

Still referring to the FIG. 1 embodiment, for purposes of example only, one or both of layers 3, 13 may be of or include silicon nitride in certain example embodiments. In other embodiments, layer(s) 3 and/or 13 may comprise silicon oxynitride and/or zirconium silicon oxynitride, or other materials that are preferably dielectric (e.g., layer 3 can be of or including an oxide of titanium). In one example embodiment, both layers 3 and 13 are of or include silicon nitride. In another example embodiment, both layers 3 and 13 include zirconium silicon oxynitride. In yet another example embodiment of this invention, layer 3 is of or includes zirconium silicon oxynitride and layer 13 is of or includes tin oxide or silicon nitride. In still another example embodiment of this invention, layer 13 is of or includes zirconium silicon oxynitride and layer 3 is of or includes titanium oxide (e.g., $TiO_2$) or silicon nitride. These example compositions of layers 3 and 13 are in no way limiting, and are intended to be used for illustrative purposes only.

Lower dielectric and substantially transparent seed layer 7 in certain embodiments of this invention is of or includes zinc oxide (e.g., ZnO) doped with a material such as Ga; e.g., to form $ZnGaO_x$ or ZnO:Ga in certain example embodiments as described above. For example, in certain example embodiments of this invention, zinc oxide based layer 7 may be doped with from about 0.01 to 10% Ga, more preferably from about 0.25 to 10% Ga, more preferably from about 0.5 to 5% Ga, and most preferably about 1-5% or 1-4% Ga. The use of gallium-doped zinc oxide 7 under and directly contacting the silver based layer 9 allows for an excellent quality of silver to be achieved (e.g., realizing low sheet resistance and low emissivity). The zinc oxide of layer 7 may contain other materials as well in certain example embodiments.

Functional layer 9 is typically an infrared (IR) reflecting layer that is preferably substantially or entirely metallic and/or conductive, and may comprise or consist essentially of silver (Ag), gold, or any other suitable IR reflecting material. IR reflecting layer 9 helps allow the coating to have low-E and/or good solar control characteristics such as low emittance, low sheet resistance, and so forth. The IR reflecting layer 9 may, however, be slightly oxidized in certain embodiments of this invention.

The upper contact layer 11 may be of or include an oxide of Ni and/or Cr. In certain example embodiments, upper contact layer 11 may be of or include nickel (Ni) oxide, chromium/chrome (Cr) oxide, or a nickel alloy oxide such as nickel chrome oxide ($NiCrO_x$), or other suitable material(s) such as Ti or an oxide of Ti. The use of, for example, $NiCrO_x$ in this layer allows durability to be improved in certain example instances. The $NiCrO_x$ layer 11 may be fully oxidized in certain embodiments of this invention (i.e., fully stoichiometric), or alternatively may only be partially oxidized. In certain instances, the $NiCrO_x$ layer 11 may be at least about 50% oxidized. Contact layer 11 (e.g., of or including an oxide of Ni and/or Cr) may or may not be oxidation graded in different embodiments of this invention. Oxidation grading means that the degree of oxidation in the layer changes throughout the thickness of the layer so that for example a contact layer may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layer 11 (e.g., of or including an oxide of Ni and/or Cr) may or may not be continuous in different embodiments of this invention across the entire IR reflecting layer 9. In other example embodiments, contact layer 11 may be of or include gallium-doped zinc oxide.

Dielectric layer 15, which may be an overcoat in certain example instances, may be of or include silicon nitride (e.g., $Si_3N_4$) or any other suitable material in certain example embodiments of this invention such as silicon oxynitride and/or zirconium oxide. Optionally, other layers may be provided above layer 15. Layer 15 is provided for durability purposes in certain example embodiments, and to protect the underlying layers. In certain example embodiments, layer 15 may have an index of refraction (n) of from about 1.9 to 2.2, more preferably from about 1.95 to 2.05.

Other layer(s) below or above the illustrated coating 25 may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses may be used in different embodiments of this invention, example thicknesses and materials for the respective layers on the glass substrate 1 in the FIG. 1 embodiment are as follows, from the glass substrate outwardly.

TABLE 1

(Example Materials/Thicknesses; FIG. 1 Embodiment)

| Layer | Range (Å) | More Preferred (Å) | Example (Å) |
|---|---|---|---|
| $TiO_x$, $ZrSiO_xN_y$, and/or $Si_3N_4$ (layer 3) | 30-400 Å | 80-250 Å | 180 Å |
| $ZnGaO_x$ (layer 7) | 10-300 Å | 60-120 Å | 50 Å |
| Ag (layer 9) | 50-250 Å | 80-150 Å | 130 Å |
| $NiCrO_x$ (layer 11) | 10-80 Å | 20-70 Å | 30 Å |
| $SnO_2$, $ZrSiO_xN_y$, and/or $Si_3N_4$ (layer 13) | 40-400 Å | 100-200 Å | 160 Å |
| Overcoat (layer 15) | 50-750 Å | 150-350 Å | 210 Å |

In certain example embodiments of this invention, coated articles herein may have the following low-E (low emissivity), solar and/or optical characteristics set forth in Table 2 when measured monolithically.

TABLE 2

Low-E/Solar Characteristics (Monolithic)

| Characteristic | General | More Preferred | Most Preferred |
|---|---|---|---|
| $R_s$ (ohms/sq.): | <=6.0 | <=5.0 | <=4.0 |
| $E_n$: | <=0.10 | <=0.08 | <=0.06 |
| $T_{vis}$ (%): | >=50 | >=60 | >=70 |

Moreover, coated articles including coatings according to certain example embodiments of this invention have the following optical characteristics (e.g., when the coating(s) is provided on a clear soda lime silica glass substrate 1 from 1 to 10 mm thick, preferably about 4 mm thick). In Table 3, all parameters are measured monolithically.

TABLE 3

Example Optical Characteristics (Monolithic)

| Characteristic | General | More Preferred |
|---|---|---|
| $T_{vis}$ (or TY)(Ill. C, 2 deg.): | >=60% | >=70% |
| $a^*_t$ (Ill. C, 2°): | -6 to +6 | -4 to +4 |
| $b^*_t$ (Ill. C, 2°): | -10 to +10.0 | -8 to +8 |
| $L^*_t$: | >=89 | >=90 |
| $R_fY$ (Ill. C, 2 deg.): | <=15% | <=12% |
| $a^*_f$ (Ill. C, 2°): | -10 to +10 | -6 to +6 |
| $b^*_f$ (Ill. C, 2°): | -14.0 to +10.0 | -10.0 to +5 |
| $L^*_f$: | 22-30 | 24-27 |
| $R_gY$ (Ill. C, 2 deg.): | <=15% | <=12% |
| $a^*_g$ (Ill. C, 2°): | -10 to +10 | -8 to +8 |
| $b^*_g$ (Ill. C, 2°): | -14.0 to +10.0 | -10.0 to +8 |
| $L^*_g$: | 25-38 | 28-37 |

Moreover, coated articles including coatings according to certain example embodiments of this invention have the following optical characteristics when the coated article is an IG unit in certain example embodiments (e.g., for purposes of reference, when the coating is provided on a clear soda lime silica glass substrate 1 from 1 to 10 mm thick, preferably about 4 mm thick). It is noted that U-value is measured in accordance with EN 673.

TABLE 4

Example Optical Characteristics (IG Unit)

| Characteristic | General | More Preferred |
|---|---|---|
| $T_{vis}$ (or TY)(Ill. C, 2 deg.): | >=60% | >=70% |
| $a^*_t$ (Ill. C, 2°): | -10 to +10 | -8 to +8 |
| $b^*_t$ (Ill. C, 2°): | -10 to +10 | -8 to +8 |
| $R_{outside}Y$ (Ill. C, 2 deg.): | <=18% | <=16% |
| $a^*_{out}$ (Ill. C, 2°): | -10 to +10 | -8 to +8 |
| $b^*_{out}$ (Ill. C, 2°): | -10.0 to +10.0 | -9 to +9 |
| $R_{inside}Y$ (Ill. C, 2 deg.): | <=18% | <=16% |
| $a^*_{inside}$ (Ill. C, 2°): | -10 to +10 | -8 to +8 |
| $b^*_{inside}$ (Ill. C, 2°): | -14 to +10 | -10 to +9 |
| U-value (IG)(W/(m²K)): | <=1.25 | <=1.15 |

Figure 2:
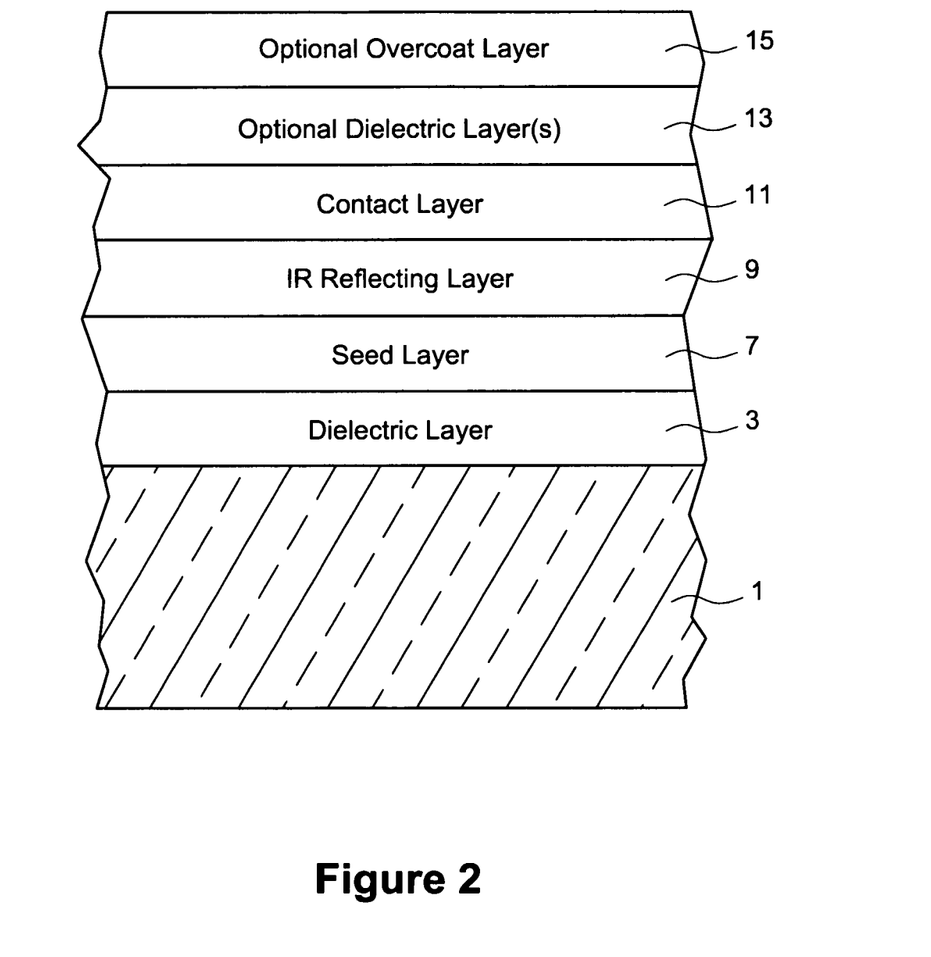
FIG. 2 is a cross-sectional view of a coated article according to a second example embodiment of this invention.

FIG. 2 is a cross sectional view of another example embodiment of this invention. The coated article of the FIG. 2 embodiment includes glass substrate 1, dielectric layer 3, dielectric seed layer 7, IR reflecting layer 9, upper contact layer 11, optional dielectric layer(s) 13 (e.g., tin oxide), and optional overcoat layer 15. Layer 9 is as described for layer 9 above in connection with the FIG. 1 embodiment. Upper contact layer 11 may be of materials such as $NiCrO_x$, NiCr, or zinc oxide. In certain example embodiments, when contact layer 11 is of or includes zinc oxide, the zinc oxide may further be doped with gallium. Dielectric seed layer 7 may also comprise zinc oxide doped with gallium—as described above. Other layers may also be provided. One or both of layers 3 and 13 may be of or include silicon nitride, silicon oxynitride, tin oxide, titanium oxide, and/or zirconium silicon oxynitride in certain example embodiments of this invention. Layer 15 may or may not be used as an overcoat of a coating in certain example embodiments of this invention. The example characteristics set forth above in Tables 2-4 may apply to the FIG. 2 embodiment in certain instances.

Figure 3:
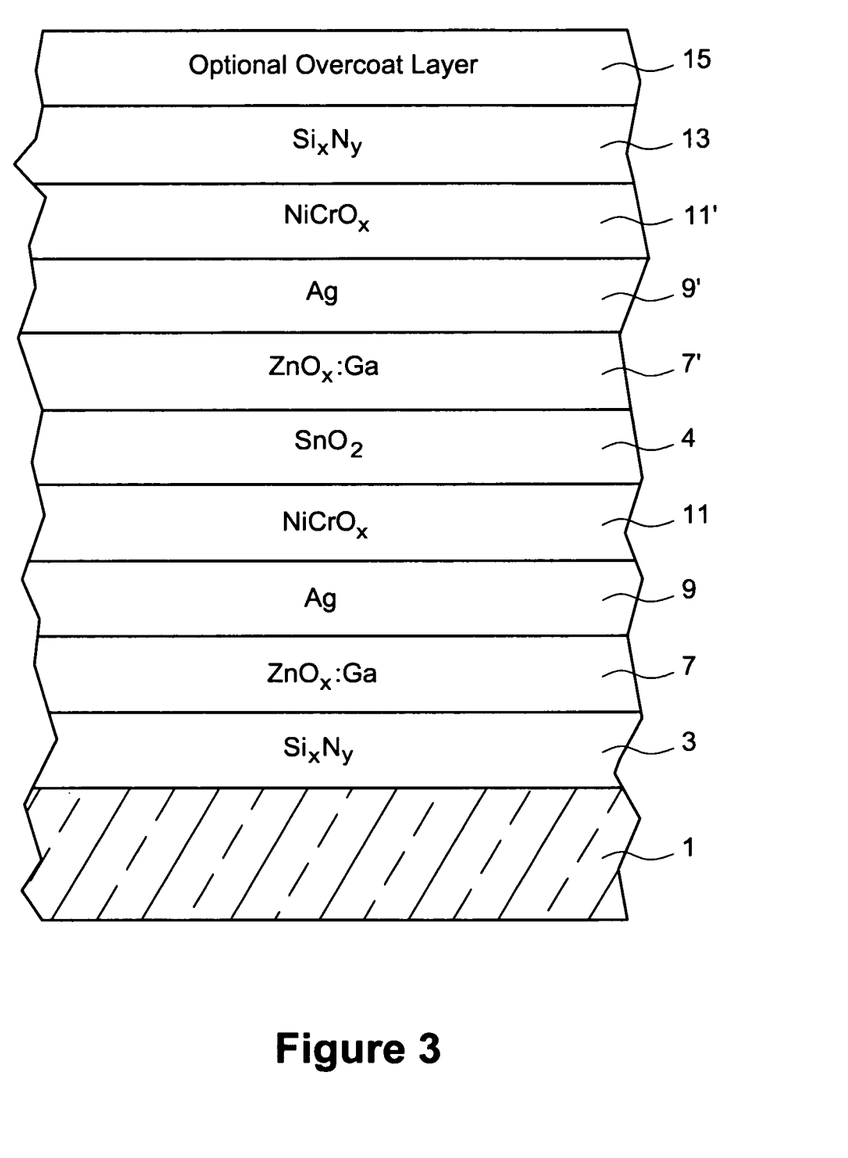
FIG. 3 is a cross-sectional view of a coated article according to a third example embodiment of this invention.

FIG. 3 is a cross sectional view of another example embodiment of this invention. FIG. 3 illustrates that gallium-doped zinc oxide layer(s) (7, 7') may be used in double-silver stacks as well in certain example embodiments of this invention. Such Ga-doped zinc oxide based seed layers may also be used in triple silver stacks or quadruple silver stacks in different example embodiments. The coating in the FIG. 3 embodiment includes IR reflecting layers 9 and 9' (same as description above for layer 9), dielectric seed layers 7, 7' (same as description above for layer 7), upper contact layers 11 and 11' (same as description above for 11), dielectric layers 3, 13 (e.g., silicon nitride, silicon oxynitride, titanium oxide or the like), dielectric and possible overcoat layer 15, and intermediate dielectric layer 4 (e.g., based on a metal oxide such as tin oxide). As mentioned above, zinc oxide-based layers 7 and 7' may be doped with material such as Ga in certain example embodiments, and the upper contact layers 11, 11' may be of or include an oxide of Ni and/or Cr, or Ti or an oxide of Ti, in certain example embodiments. In other example embodiments, upper contact layers 11 and/or 11' may be of or include an oxide of zinc, which may or may not be doped with gallium. One or both of dielectric layers 3, 13 may be of or include silicon nitride and/or silicon oxynitride in certain example embodiments. As mentioned above, this particular coating is for purposes of example only and is not intended to be limiting unless expressly claimed. As with other embodiments herein, layer 3 may or may not be in direct contact with the glass substrate 1. Thus, another layer(s) may be provided between the substrate 1 and layer 3 in certain example instances.

Figure 4:
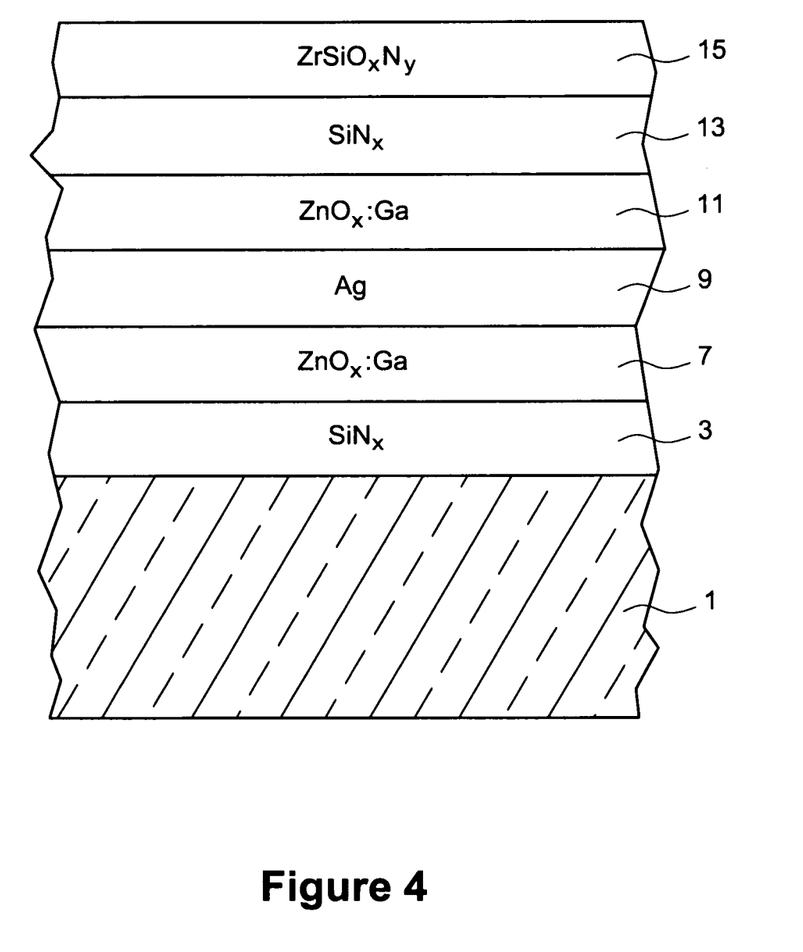
FIG. 4 is a cross-sectional view of a coated article according to a fourth example embodiment of this invention.

FIG. 4 illustrates another example embodiment of this invention. In FIG. 4, a Ga-doped zinc oxide based dielectric layer 11 is provided over and contacting the silver based IR reflecting layer 9, in addition to a similar layer 7 being located below and contacting the silver based layer. Layers 3, 13 and 15 are preferably dielectric layers in this embodiment, with example materials being shown in FIG. 4. The FIG. 4 embodiment includes a coating which includes a dielectric layer of or including silicon nitride 3, dielectric seed layer 7 of a material such as gallium-doped zinc oxide, IR reflecting layer 9 of silver or the like, upper contact layer 11 of zinc oxide (which may optionally be doped with gallium in certain example embodiments), dielectric layer 13 of or including silicon nitride or the like, and an overcoat of or including silicon nitride, silicon oxynitride, and/or zirconium silicon oxynitride 15.

In certain example embodiments of the FIG. 4 embodiment, layers 3 and 13 may each be from about 100 to 300 Å thick (most preferably about 200 Å thick), layers 7, 11 may each be about 100 to 300 Å thick (most preferably about 180 Å thick), IR reflecting layer 9 may be from about 80 to 200 Å thick (most preferably about 120 Å thick), and layer 15 may be from about 100 to 300 Å thick (most preferably about 200 Å thick). The thicknesses of the different layers can be adapted to the different possible uses of the coating (e.g., as coated or heat treatable). Optionally, another contact layer of NiCrO$_x$ may be provided between the IR reflecting layer 9 and the zinc oxide based contact layer 11 in the FIG. 4 embodiment in certain example embodiments of this invention. The zirconium oxynitride overcoat layer in FIG. 4 is for purposes of example only, and layer 15 may comprise another dielectric material.

Figure 5:
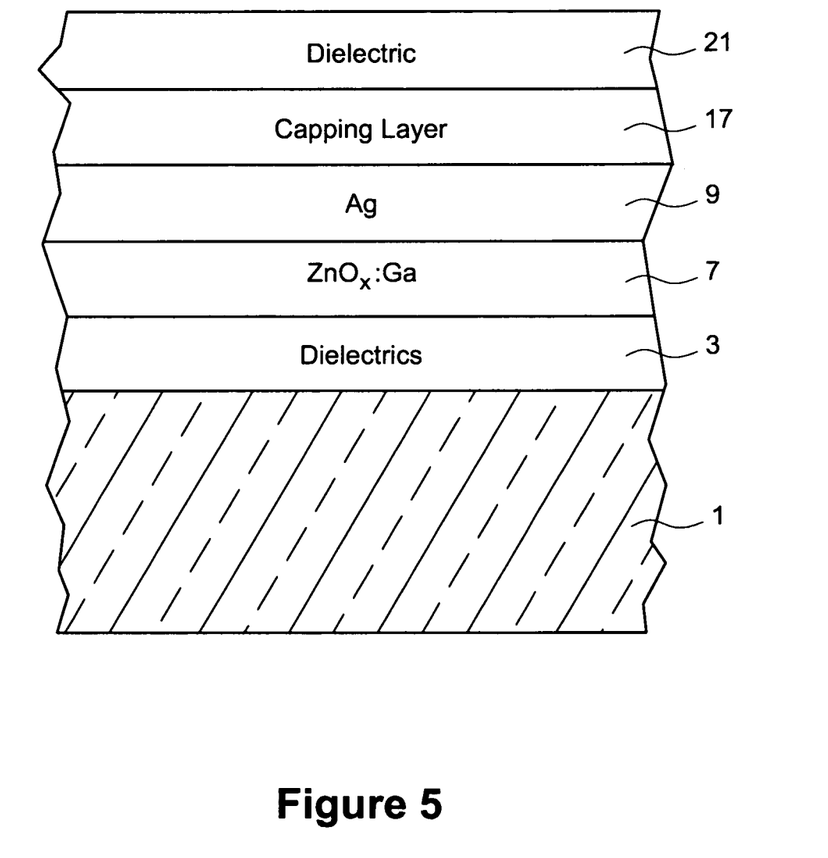
FIG. 5 is a cross-sectional view of a coated article according to a fifth example embodiment of this invention.

The FIG. 5 embodiment shows generally that dielectric layer(s) 3 may be provided under ZnO:Ga seed layer 7, and that IR reflecting layer 9 comprising silver and/or gold is over and contacting the ZnO:Ga based layer 7. Capping layer(s) 17 is provided over layer 9, though other layers may be provided therebetween, such as contact layer(s). Dielectric layer(s) 21 may be provided over the rest of the layers in the stack.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising at least the following layers moving away from the glass substrate:
    a dielectric lower contact layer comprising zinc and gallium;
    a first infrared (IR) reflecting layer comprising silver and/or gold located on the substrate over and directly contacting the lower contact layer comprising zinc and gallium, the first IR reflecting layer being the closest IR reflecting layer to the glass substrate so that no other IR reflecting layer is located between the first IR reflecting layer and the glass substrate,
    an upper contact layer comprising zinc and gallium, wherein the first IR reflecting layer is located between and directly contacting the lower contact layer comprising zinc and gallium and the upper contact layer comprising zinc and gallium;
    a dielectric layer comprising silicon oxynitride on the substrate over at least the upper contact layer, so that the upper contact layer comprising zinc and gallium is located between and directly contacting the first IR reflecting layer and the dielectric layer comprising silicon oxynitride; and
    wherein the lower contact layer comprising zinc and gallium includes from about 0.01 to 10% gallium in terms of weight %.

2. The coated article of claim 1, wherein in the lower contact layer comprising zinc and gallium and in the upper contact layer, an ionic radius of zinc and an ionic radius of gallium differ by no more than about 15 pm.

3. A window including the coated article of claim 1, wherein the lower contact layer comprising zinc and gallium is substantially transparent.

4. The coated article of claim 1, wherein the coating is a low-emissivity (low-E) coating.

5. The coated article of claim 1, wherein each of the lower contact layer and the upper contact layer comprises zinc oxide doped with gallium.

6. The coated article of claim 1, wherein the lower contact layer comprising zinc and gallium consists essentially of zinc oxide doped with gallium.

7. The coated article of claim 1, wherein each of the lower contact layer and the upper contact layer comprises from about 0.25 to 10% gallium in terms of weight %.

8. The coated article of claim 1, wherein the lower contact layer comprising zinc and gallium comprises an oxide of zinc and gallium and includes from about 1 to 5% gallium in terms of weight %.

9. The coated article of claim 1, wherein the ionic radius of zinc and the ionic radius of gallium differ by no more than about 13.5 pm.

10. The coated article of claim 1, wherein the lower contact layer comprising zinc and gallium is from about 10-300 angstroms thick.

11. The coated article of claim 1, wherein the coating further comprises a second IR reflecting layer that is located over at least the first IR reflecting layer and the upper contact layer.

* * * * *